United States Patent Office 3,444,600
Patented May 20, 1969

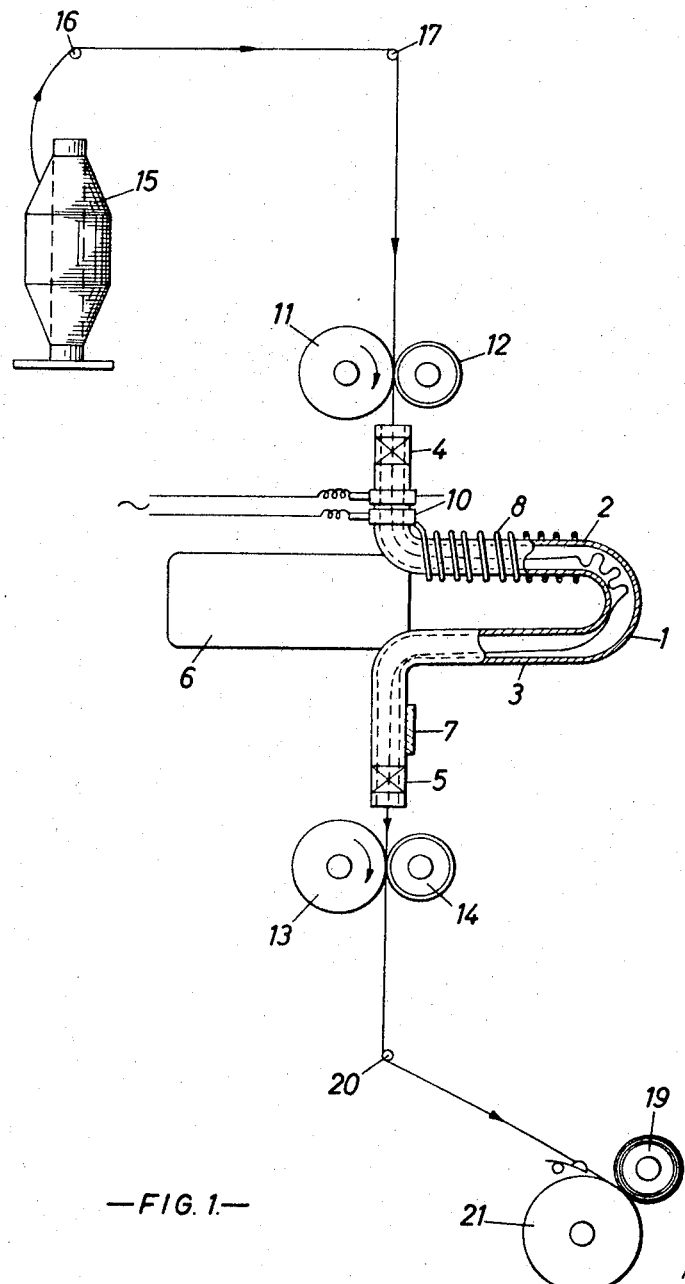
—FIG. 1.—

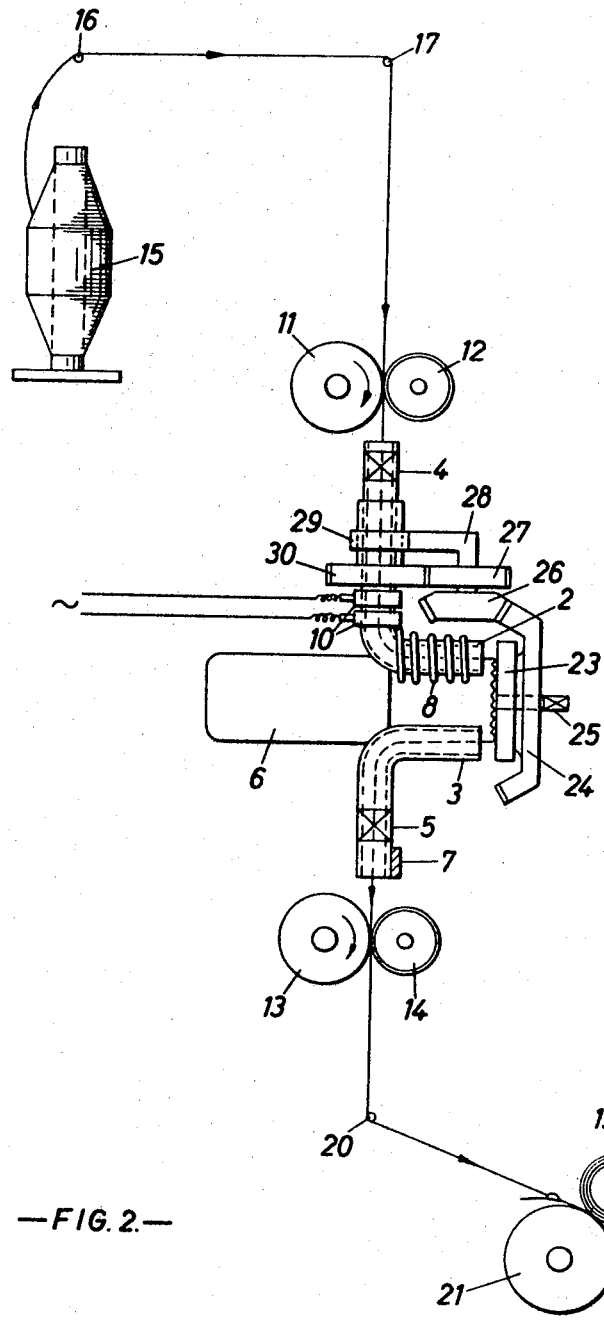

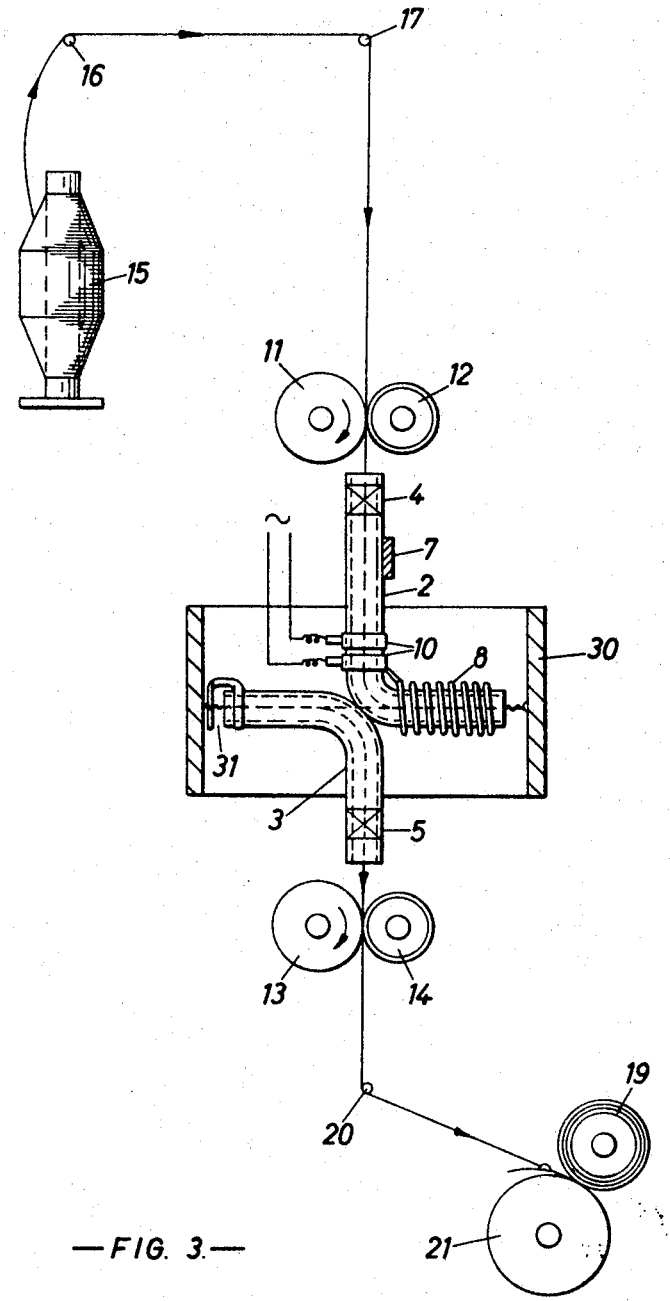
—FIG. 3.—

3,444,600
APPARATUS FOR PROCESSING SYNTHETIC PLASTIC FILAMENTS
Frederick Scragg, Mobberley, and Alexander Albert Chubb, Macclesfield, England, assignors to Ernest Scragg & Sons (Holdings) Limited
Original application Oct. 7, 1963, Ser. No. 314,351. Divided and this application Nov. 15, 1967, Ser. No. 683,296
Claims priority, application Great Britain, Oct. 15, 1962, 37,710/62
Int. Cl. D02g 3/00, 1/00; D04h 17/00
U.S. Cl. 28—1          10 Claims

ABSTRACT OF THE DISCLOSURE

A tube having two mutually inclined branches is rotated about the axis perpendicular to one of these branches. A synthetic plastic filament is advanced first through the aforementiond one branch and thereupon through the other branch which is inclined with reference thereto. Heating means heats and thereby softens the filament. Rotation of the tube subjects the filament portions in the other of the branches to centrifugal force whereby the filament tends to move through the other branch and outwardly thereof. An abutment surface is provided against which the softened filament abuts whereby it is crimped.

Cross-references to related applications

An application, filed on Oct. 7, 1963 in the names of Frederick Scragg et al. and entitled "Methods of Processing Thermoplastic Textile Filaments" is copending under Serial No. 314,351 and now abandoned, of which the present application is a division.

Background of the invention

The present invention relates to processing of synthetic plastic filaments, and more particularly to the processing of thermoplastic synthetic filaments. Still more particularly the present invention relates to the crimping of such thermoplastic filaments.

In the textile art it is necessary for many reasons and applications to crimp synthetic plastic filaments, and particularly thermoplastic filaments. Such crimping affects the "hand" of a fabric or textile made with the crimped filament, that is the feel of such a textile, it affects the extendability of the crimped filament, and it affects the wearing properties of textiles manufactured from such filaments, to name only a few reasons for crimping. The present invention provides a novel apparatus for providing such crimping of filaments of this type.

Summary of the invention

The present invention provides an apparatus in which crimping of synthetic plastic filaments is effected under the influence of centrifugal force.

More particularly, the present invention provides such an apparatus wherein the synthetic plastic filament is advanced under the influence of centrifugal force against an abutment surface, and is crimped by such engagement with the abutment surface.

The apparatus according to the present invention is capable of continuous and discontinuous operation and can crimp continuous and discontinuous length of filament.

The term filament here is applied not only to monofilaments but also to yarns, such as strands of filaments which have been twisted together or united in another manner.

By virtue of its lack of complexity the present apparatus according to the present invention can be inexpensively constructed, is not costly to maintain and can be operated even by unskilled or semi-skilled operators. The apparatus is also small so that it can be advantageously employed in circumstances where conventional crimping apparatus cannot be accommodated in the available space only with difficulty or cannot be accommodated at all.

In accordance with one feature of our invention, we provide an apparatus for processing synthetic plastic filaments which comprises a first means operative for advancing a synthetic plastic filament in a predetermined path from a first location to a second location downstream of the first location. Such first means should be understood to comprise both a filament supply in form of a bobbin or other supply means, and a filament take-up which is arranged downstream of the supply, namely at the second location. A second means is provided for softening the filament intermediate these two locations and, in the case of thermoplastic filament, such second means will of course advantageously consist of a heating means. Finally, third means is provided which defines an abutment surface and which is operative for advancing the softened filament lengthwise against and into engagement with the abutment surface whereby the filament has imparted thereto a crimped configuration.

As mentioned before, the filaments may be continuous or discontinuous, and preferably they are continuous and are also continuously treated. In one embodiment of the invention, the crimped filament portions may be removed from the abutment surface by pressure which is exerted upon them by succeeding filament portions. In another embodiment the crimped filament portions may be carried away from the point of impingement by rotation of the surface with respect to the point towards which successive filament portions are urged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 1 is a partial sectional elevation of an apparatus representing one embodiment of our invention;

FIG. 2 is a view similar to FIG. 1, but illustrating another embodiment of the invention; and FIG. 3 is a view similar to the preceding figures but illustrating yet a further embodiment of the invention.

Description of the preferred embodiments

Discussing now the drawing in detail, and referring firstly to FIG. 1, it will be seen that a tubular member 1 of substantially U-shaped configuration, and provided with two mutually inclined branches 2, 3 is mounted in the coaxial bearings 4, 5 for rotation about the axis which is common to these bearings. A member 6 is provided and secured to the tubular member 1 so as to act as a counter-balance and this need not be further described because it is a well known expedient which does not constitute a part of the invention. Rotation of the tubular member 1 is effected in a suitable manner, and in the illustrated embodiment of FIG. 1 rotary motion is assumed to be imparted to the tubular member 1 by a drive belt 7 which engages the member 1 and which is driven by a non-illustrated drive means. This, also, is well known and mention of this arrangement is made here only to provide a proper understanding of the operation.

Heating means, in form of a heater winding 8, is provided and in the illustrated embodiment this heater winding 8 is convoluted about the branch 2 of the tubular member 1. Although this is not specifically illustrated, it is preferred to surround the heater winding 8 with a layer of insulating material. Electrical energy is supplied to the heater winding 8 from a non-illustrated electrical supply via conventional slip rings 10.

Filament supply means in form of a bobbin 15 having a filament to be processed wound thereon is arranged upstream of the tubular member 1. From the bobbin 15 the filament is guided in the direction of the arrow heads via suitable guides 16, 17 towards and between a pair of rollers 11, 12 of which the roller 11 may be driven (compare the arrow) whereas the roller 12 may serve as a nip roller, the latter being mounted in such a manner as to be pressed against the driven roller 11, hence the term nip roller. Advantageously the roller 12 is provided with a covering of resilient material in known manner.

Upon passing between the rollers 11 and 12, the filament enters the upstream open end of the tubular member 1, passes through the branch 2, and thereupon the branch 3, and leaves the tubular member 1 through the downstream open end thereof. On leaving this downstream open end, the filament passes between another pair of rollers 13, 14, of which the roller 13 is assumed to be driven in the direction of the arrow associated therewith, whereas the roller 14 is assumed to be a nip roller which is advantageously again covered with a resilient material. The rollers 13, 14 serve to withdraw the filament from the tubular member 1, and to convey the filament via the guide 20 to a take-up arrangement consisting of a filament package 19 which is driven, preferably at constant peripheral speed, by a drive roller or "bowl" 21.

As the yarn enters the upstream open end of the tubular member 1, it is subjected to the heating action of the winding 8 and is accordingly softened. In view of the fact that the now softened yarn passes through the branch 2 it becomes subject to centrifugal force as soon as it enters this branch 2 because the tubular member 1 is of course rotated rapidly by the belt 7, as already pointed out earlier. Under the influence of this centrifugal action, the softened yarn advances along the branch 2 and towards the curved portion of the tubular member 1, which in effect constitutes the bight of the U-shape. The softened yarn has, however, the tendency to advance in a straight line and therefore necessarily encounters the inner surface of the tubular member in the region of this curved bight portion. Being advanced into contact with this inner surface as a result of the prevailing centrifugal force and of the pressure of subsequent yarn portions, the yarn is crimped by contact with the inner surface, thus forming kinks as illustrated in FIG. 1. Again, it should be pointed out that the terms yarn and filament as used herein are interchangeable in that both yarns and individual filaments can be treated or processed with the novel apparatus.

The yarn or filament which has been crimped in the manner just described is pulled around the curved portion of the tubular member 1, through the branch 3 and through the downstream open end of this branch by the rollers 13, 14, and is thereupon advanced to the yarn package 19. The branch 3 is of course not heated, as evident from the drawing, so that cooling-down of the yarn or filament already takes place in this branch whereby the crimp is set or at least partially set in the material. Of course, additional specific means for effecting cooling of the crimped yarn or filament can be provided if desired and this is a well known expedient and need not be further discussed.

Coming now to the embodiment of FIG. 2, it will be seen that in many respects this is identical with that of FIG. 1. Accordingly, identical reference numerals have been used to designate those elements of FIG. 2 which are the same as the corresponding elements in FIG. 1.

Where FIG. 2 differs from FIG. 1 is in the actual crimp-imparting arrangement. Specifically, the arrangement for transferring crimped yarn or filament from branch 2 of the tubular member to branch 3 thereof differ from that of FIG. 1. As before, the yarn or filament is withdrawn from the supply 15 via the guides 16 and 17, by the rollers 11 and 12. The branch 2 of the tubular member is again provided with a heating winding 8 to which electrical energy is supplied via the slip ring 10.

Unlike the embodiment of FIG. 1, however the branches 2 and 3 are entirely separate. They are mounted for rotation about an axis common to the bearings 4 and 5, just as previously described, but the curved or bight portion present in the tubular member 1 of FIG. 1 has been eliminated in FIG. 2. Thus, the branch 2 has an open downstream end and the branch 3 has an open upstream end. In accordance with the embodiment of FIG. 2 a circular plate 23, which advantageously is cooled is so positioned that an abutment surface of this plate is juxtaposed with the downstream end and the upstream end of the branches 2 and 3, respectively. In other words, this abutment surface of the plate 23 extends transversely of the direction of yarn or filament advancement as is clearly shown in FIG. 2. The plate 3 is connected to a gear wheel 24 and rotatable therewith on a common shaft which passes through a bearing 25, mounted on the non-illustrated frame of the machine. The gear 24 meshes with an additional gear 26 which in turn is connected to a spur gear 27, the gears 26 and 27 being carried on a shaft 28. The latter shaft in turn is provided with a bearing 29 mounted on the upstream end of the branch 2, and the gear 27 meshes with a fixed gear 30. The entire assembly comprising the members 2, 3, 23, 24, 26, 27 and 28, together with a counterweight 6 corresponding to that illustrated in FIG. 1, is rotated as described in connection with FIG. 1, namely in this instance by a drive belt 7. Thus, the circular plate 23 rotates relatively slowly about the shaft with which it and the gear 24 are mounted in the bearing 25, even while the plate 23 and the gear 24 themselves rotate together with the branches 2 and 3 about the common axis of bearings 4 and 5. Filament passing through the branch 2 under the influence of centrifugal action generated by rotation of the same are heated by the winding 8 and urged against the abutment surface provided on the circular plate 23. This results in crimping in the same manner as described before with reference to FIG. 1. However, as a result of the rotation of the plate 23, the crimped portions of the filament which in effect form at a given time a small pile of compression crimped filaments are drawn out into a circumferential line until the leading end of this line reaches the upstream open end of the branch 3. Inasmuch as the rollers 13, 14 exert a pull in the direction of the arrow heads associated with the filament, crimped yarn or filament is withdrawn from the circular plate 23, along the branch 3, and is advanced to the take-up arrangement in the same manner described with reference to FIG. 1, earlier.

Coming, finally, to the embodiment of FIG. 3, it is again to be noted that those elements which correspond to the elements of FIG. 1 are identified with reference numerals identical with those employed in FIG. 1. In FIG. 3 the filament which is being advanced by the rollers 11, 12 enters into the branch 2 of the tubular member to be softened therein by heat emanating from the winding 8. The branch 3 of the tubular member in this case is again mounted for coaxial rotation with the branch 2, although the open upper or upstream inlet end of the branch 3 is angularly offset, for instance by 180°, with reference to the open downstream or outlet end of the branch 2. The branches 2 and 3 are surrounded by a cylindrical member 30 which is mounted for independent rotation about the axis defined by the bearings 4 and 5, such rotation however, being different from that of the branches 2 and 3 which latter are advantageously formed as a unitary structure. The inner circumferential surface of the cylindrical member 30 is slightly spaced from the open downstream end of the branch 2 and from the open upstream end of the branch 3, and FIG. 3 illustrates that the softened yarn advancing through the branch 2 impinges upon this inner circumferential surface of the tubular member 30 thereby being crimped. The cylindrical member 30 may be cooled, or it may not be separately cooled. In any case, it is not heated so that the yarn or filament will be subjected to at least some cooling action and the attendant fixing of the crimp upon contact with this inner circumferential surface of the tubular cylindrical member 30. Owing to the difference in the rotational speed between the branches 2 and 3 on the one hand, and the cylindrical member 30 on the other hand, a band of crimped yarn portions forms on the inner circumferential surface of the cylindrical member 30 and the leading end of this band shortly reaches the upstream open end of the branch 3. On so reaching this open upstream end of the branch 3, the band of crimped yarn is lifted off the inner circumferential surface of the cylindrical member 30 by a suitable means, here illustrated as a scoop 31 mounted on the branch 3, and is guided into the latter from where it is withdrawn by the rollers 13, 14 to be forwarded to the take-up 19, 20.

It is clear from a consideration of FIGS. 1–3 that the principle involved in the present invention is always the same, namely rotation of a downstream portion of a filament to be treated about an upstream portion of the same filament, to thereby effect advancement of the filament in a predetermined path under the influence of the resulting centrifugal force, and into engagement with an abutment surface to cause the filament to be crimped. With the apparatus herein disclosed, it is possible to achieve a very complete control of the degree of crimp. Thus, a rise in the temperature of the heating winding 8, and accordingly a change in the amount of heat transmitted to yarn moving through the branch 2, causes a reduction in modulus of the yarn so that the average length of the yarn between crimps is reduced. On the other hand, an increase in the rotational speed of the branches 2, 3 has the same effect so that the average crimp length can be adjusted and controlled to suit the particular type of filament or yarn which is being processed, or to obtain the particular kind of effect which is required. Moreover, in view of the fact that the yarn or filament is heated and allowed to cool, or separately cooled, if this is desired, in a continuous process the uniformity of treatment can be and is of a very high order unless specifically desired otherwise, and such uniformity is considerably better than in the prior-art approaches to achieving the desired crimp, namely by heating a yarn in a crimping chamber or stuffing box.

It will be understood that each of the elements described above, or two or more together, may also find a useful application in other types of applications, differing from the types described above.

While the invention has been illustrated and described as embodied in an apparatus for processing synthetic plastic filaments, it is not intended to be limited to the details shown since various modifications and structural changes may be made without departing in any way from the spirit of the present invention.

What is claimed as new and desired to be protected by Letters Patent and set forth in the appended claims is:

1. Apparatus for processing synthetic plastic filaments, comprising, in combination, first means arranged to advance a synthetic plastic filament in a predetermined path from a first location to a second location downstream of said first location; second means for softening the filament upstream of said second location; and third means defining an abutment surface and operative for advancing the softened filament lengthwise against and into engagement with said abutment surface to thereby impart to the filament a crimped configuration.

2. Apparatus as defined in claim 1, wherein said first means comprises filament supply means arranged at said first location, and filament take-up means arranged at said second location.

3. Apparatus as defined in claim 1, wherein said third means comprises means operative for revolving a length of the filament which is closer to said second location about a length of the filament which is closer to said first location whereby to subject said filament to centrifugal force and effect advancement of the filament against said abutment surface under the influence of such centrifugal force.

4. Apparatus as defined in claim 3, wherein said means comprises a tubular member having two mutually inclined branches coextensive with at least a portion of said path and being arranged for rotation about the axis of the upstream one of said branches, so that filament extending through said branches is compelled to participate in such rotation and filament increments in said downstream branch are urged outwardly through an outlet end of the same and away from said axis.

5. Apparatus as defined in claim 4, wherein said two branches extend substantially normal to one another.

6. Apparatus as defined in claim 4, wherein said abutment surface is a portion of the inner surface of the downstream one of said branches.

7. Apparatus as defined in claim 4, wherein the downstream one of said branches has an open downstream end, said third means further comprising a turnable element fixedly mounted on said tubular member for rotation about said axis of said upstream branch, and turnable about an axis parallelling the axis of said downstream branch and provided with said abutment surface, said abutment surface extending transversely of said axis of said downstream branch so that filament issuing from said open end impinges upon said abutment surface whereby it is crimped, and thereupon advances transversely of said axis of said downstream branch away therefrom as said element turns.

8. Apparatus as defined in claim 4, wherein said third means comprises an additional tubular member arranged for rotation with said tubular member, and having a downstream branch section adapted to revolve about said axis and an upstream branch section inclined with reference to said downstream branch section and having an inlet end angularly spaced from said outlet end, and a cylindrical member having an inner circumferential surface surrounding said tubular members with slight spacing from said outlet end and said inlet end, said inner surface constituting said abutment surface and said cylindrical member being arranged for rotation about said axis with an angular velocity different from that of said tubular members, whereby filament portions which abut against said abutment surface and are crimped thereby are conveyed to the vicinity of said inlet end for entry thereinto and subsequent passage through said second tubular member.

9. Apparatus as defined in claim 8, wherein said downstream branch section of said second tubular member is coaxial with said upstream branch section of said first tubular member.

10. Apparatus as defined in claim 8, wherein said cylindrical member is arranged for rotation about said axis with an angular velocity smaller than that of said tubular members.

References Cited
UNITED STATES PATENTS

| | | | |
|---|---|---|---|
| 3,146,512 | 9/1964 | Heijnis | 28—72 XR |
| 3,156,028 | 11/1964 | Weiss et al. | 57—157 XR |
| 3,166,820 | 1/1965 | Taul et al. | 28—1 |

DONALD E. WATKINS, *Primary Examiner.*

U.S. Cl. X.R.

28—72